US009959461B2

(12) United States Patent
Mueller et al.

(10) Patent No.: US 9,959,461 B2
(45) Date of Patent: *May 1, 2018

(54) VEHICLE GESTURE RECOGNITION SYSTEM AND METHOD

(71) Applicant: Harman Becker Automotive Systems GmbH, Karlsbad (DE)

(72) Inventors: Florian Mueller, Frankfurt (DE); Peter Wagner, Waiblingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/469,356

(22) Filed: Mar. 24, 2017

(65) Prior Publication Data

US 2017/0200047 A1 Jul. 13, 2017

Related U.S. Application Data

(63) Continuation of application No. 14/091,281, filed on Nov. 26, 2013, now Pat. No. 9,639,162.

(30) Foreign Application Priority Data

Nov. 30, 2012 (EP) ..................................... 12195018

(51) Int. Cl.
*G06K 9/00* (2006.01)
*B60K 35/00* (2006.01)

(52) U.S. Cl.
CPC .......... *G06K 9/00355* (2013.01); *B60K 35/00* (2013.01); *G06K 9/00832* (2013.01); *B60K 2350/1052* (2013.01); *B60K 2350/2013* (2013.01)

(58) Field of Classification Search
CPC .... G06F 3/017; B60K 37/06; G06K 9/00355; G06K 9/00845
See application file for complete search history.

(56) References Cited

U.S. PATENT DOCUMENTS

| 2002/0126876 A1 | 9/2002 | Paul et al. |
| 2003/0001908 A1* | 1/2003 | Cohen-Solal ............ H04N 5/45 715/863 |
| 2005/0134117 A1 | 6/2005 | Ito et al. |

(Continued)

OTHER PUBLICATIONS

European Patent Office, Extended European Search Report Issued in Application No. 12195018.2, dated Jun. 7, 2013, Netherlands, 8 pages.

(Continued)

*Primary Examiner* — Shaheda Abdin
(74) *Attorney, Agent, or Firm* — McCoy Russell LLP

(57) ABSTRACT

Embodiments of vehicle gesture recognition systems and methods are disclosed. An example vehicle gesture recognition system comprises a data interface configured for receiving 2d image data from a 2d sensor and/or from a portable device camera via a portable device interface. Additionally or alternatively, the data interface is configured for receiving gesture data indicating a gesture. A vehicle processing unit is configured for controlling user interfacing with a user interface based on the gestures recognized from the 2d image data and/or as indicated by the gesture data.

20 Claims, 5 Drawing Sheets

(56) References Cited

U.S. PATENT DOCUMENTS

| | | | |
|---|---|---|---|
| 2005/0248136 A1* | 11/2005 | Breed | B60R 21/0152 |
| | | | 280/735 |
| 2006/0047386 A1 | 3/2006 | Kanevsky et al. | |
| 2006/0145825 A1 | 7/2006 | McCall | |
| 2007/0274561 A1 | 11/2007 | Rhoads et al. | |
| 2009/0271004 A1* | 10/2009 | Zecchin | G05B 15/02 |
| | | | 700/13 |
| 2009/0278915 A1 | 11/2009 | Kramer et al. | |
| 2011/0304444 A1* | 12/2011 | Zhang | B60K 35/00 |
| | | | 340/425.5 |
| 2012/0044243 A1* | 2/2012 | Kim | G06F 3/04883 |
| | | | 345/419 |
| 2012/0207345 A1 | 8/2012 | Tang | |
| 2013/0063336 A1* | 3/2013 | Sugimoto | B60K 35/00 |
| | | | 345/156 |

OTHER PUBLICATIONS

European Patent Office, Office Action Issued in Application No. 12195018.2, dated May 23, 2016, Netherlands, 6 pages.

\* cited by examiner

VEHICLE GESTURE RECOGNITION SYSTEM AND METHOD

CROSS REFERENCE TO RELATED APPLICATIONS

The present application is a continuation of U.S. Non-Provisional patent application Ser. No. 14/091,281, entitled "VEHICLE GESTURE RECOGNITION SYSTEM AND METHOD," and filed on Nov. 26, 2013. U.S. Non-Provisional patent application Ser. No. 14/091,281 claims priority to European Patent Application No. 12195018.2, filed on Nov. 30, 2012. The contents of each of the above-referenced applications are hereby incorporated by reference for all purposes.

TECHNICAL FIELD

Various embodiments relate to a vehicle gesture recognition system and a method of gesture recognition in a vehicle. In particular, various embodiments relate to techniques which allow for receiving two-dimensional image data for gesture recognition and/or for receiving of gesture data indicating a gesture.

BACKGROUND

Techniques for gesture recognition are often utilized in the field of user input/output and user interfacing. For example, a gesture may relate to a user using a part of the body, e.g., a hand or fingers of the hand, for non-verbal communication. Other examples of gestures are head movements, body movements, sign language, hand and arm movement, etc. Techniques may be used to recognize the gesture and use the gesture to control a user interface. In vehicles, gesture recognition may allow for interfacing with a vehicle head unit which controls different functionalities of the vehicle.

Typically, for gesture recognition, a plurality of three-dimensional (3d) cameras or stereoscopic cameras indicating a distance of a certain object with respect to the at least one camera, are employed. From the various perspectives, e.g., by means of a stereoscopic calculation, and/or the 3d information, reliable gesture recognition is possible. Such techniques typically rely on determining a 3d position of a gesture-related object, e.g. a user's hand.

However, such vehicle gesture recognition systems may face certain restrictions. For example, the different parts may be comparably costly. Moreover, the control and implementation of such systems may be comparably complex and time-consuming. Training of the system may be needed. Failures may be comparably likely to occur due to the high level of complexity.

In particular in the vehicle environment, multiple ways of user interfacing are available, including buttons, touch panels, rotary buttons, etc. Therefore, the additional high costs of a vehicle gesture recognition system may be undesired.

SUMMARY

According to an aspect, a vehicle gesture recognition system is provided. An example vehicle gesture recognition system comprises a data interface configured for receiving two-dimensional (2d) image data of at least one field of view within the vehicle. The vehicle gesture recognition system further comprises a vehicle processing unit configured for recognizing a gesture from the received 2d image data and controlling user interfacing with a user interface based on the recognized gesture.

The 2d image data may relate to a 2d array of pixels where each pixel has at least one assigned pixel value. For a 2d camera operative in visible range, the pixel value may be representative of a brightness and/or color. In contrast to 3d image data, the pixel value may not be directly representative of a distance from the imaged object to the camera. In other words, it may be dispensable to determine a 3d position of a gesture-related object, e.g. a user's hand. It may be sufficient to determine a 2d position of the gesture-related object. The 2d image data may be provided in conventional data formats, such as still picture formats, e.g. jpg, tiff, etc., or image stream formats, moving picture formats, etc. For example, it is possible that the 2d image data images a time series of a given length in order to detect a dynamic gesture, e.g. a movement or the like. It is possible that the 2d image data comprises vectors indicating a direction of a dynamic movement.

By using 2d image data, comparably simple gesture recognition may be employed—in particular if compared to more complex systems, where 3d image data is used for the gesture recognition. In particular, gesture recognition may be employed which is able to recognize gestures selected from the group comprising gestures such as: wipe left-to-right, wipe right-to-left, wipe top-to-bottom, wipe bottom-to-top, turn right, turn left, push, handwriting, sign language, etc.

For example, the push gesture may be recognized based on an objected related to the gesture becoming larger over a time-series of the 2d image data. Respectively, a wipe left-to-right gesture may be recognized based on the object moving from one side to the other side in the time-series of the 2d image data.

For example, it is possible to restrict the gesture recognition to a predefined set of gestures selected from the group as described above. Typically, such gestures as described with respect to the group above can be used to control the user interfacing with a graphical user interface (GUI) as often present in vehicles. For example, the wipe commands can be used for cursor control, while the turning commands can be used for dialing commands, and the pushing gesture can be used for executing commands. Such examples of possible applications of the recognized gesture in the user interfacing are merely illustrating and shall not be construed as being limiting.

For example, by restricting said recognizing of the gesture to a predefined set of gestures as discussed above, an increased likelihood of successful gesture recognition may be achieved. Moreover, by employing the 2d image data for said recognizing of the gesture, simplified processing as part of said recognizing of the gesture may be achieved. Fewer computational resources occupied at the vehicle processing unit and shorter latency times may be achieved.

User interfacing may relate to the interaction of a user with the user interface. The interaction may comprise output to the user and/or input from the user. Typical examples for the user interface are GUIs where a menu structure or the like, together with information is graphically presented to a user of the system.

The field of view may relate to a line of sight or sensitive region of an image source of the 2d image data. In other words, the field of view may define the region which is covered by the 2d image data. Therefore, when a user executes the gesture within the field of view, the 2d image data may image or picture the gesture.

For example, the data interface may receive the 2d image data from an external image source. The external image source, e.g., a third-party portable device such as a webcam, cell phone, gaming console, touchpad, or a laptop, etc. may provide the 2d image data to the vehicle gesture recognition system. It is possible that the external image source is a touch pad. In such a scenario the field of view may refer to the sensitive region of the touch pad. By such techniques, it may be dispensable to provide a dedicated image source for acquiring the 2d image data—yet it is possible to provide an image source.

The vehicle gesture recognition system may comprise a portable device interface configured for establishing a data connection between a portable device and the data interface. The data interface may be configured to receive at least parts of the 2d image data via the data connection from a 2d sensor of the portable device.

For example, the portable device may be selected from the group comprising: a webcam, a cell phone, a gaming console, a touchpad, and a laptop. For example, the 2d sensor may be a 2d optical camera or a touch pad.

For example, the data connection between the portable device and the data interface may be established by the portable device interface using one or more data connection standards selected from the group comprising: Wireless Local Area Network (WLAN), Bluetooth, Near Field Communication (NFC), Ethernet, Universal Asynchronous Receiver Transmitter (UART), Media Orientated System Transport (MOST), Controller Area Network (CAN), Universal Serial Bus (USB). The data connection may employ a wired link and/or a wireless link. Different parts of the data connection, e.g. between the data interface and the portable device interface, as well as between the portable device interface and the portable device, may operate according to different data communication standards, etc.

Besides such electronic functionality as described above, the portable device interface may also provide mechanical functionality.

In particular, the portable device interface may be configured to releasably mount the portable device in a predetermined position.

For example, the portable device interface may be arranged in a well-defined position within a reference coordinate system explicitly or implicitly known by the vehicle gesture recognition system. Thereby, the field of view of the 2d sensor or camera of the portable device may have a well-defined and predetermined arrangement as well. This may facilitate said recognizing of the gesture, because the sensor or camera position may be known.

For example, it is possible that the portable device interface receives, holds in a fixed position, and—upon user actuation—releases the portable device. In other words, the portable device interface may be configured for releasably mounting the portable device.

For example, the predetermined position of the portable device interface may be achieved by fixedly mounting the portable device interface to a particular position in the interior of the vehicle. In a state where the portable device is mounted to the portable device interface, it may then be possible to determine the position of the portable device as well.

For example, the portable device interface may further comprise locking means which are configured for engaging with side surfaces of the portable device for said releasably mounting. The locking means may comprise resilient means which secure the portable device and may be actuated in order to release the portable device from the portable device interface.

It should be understood that it is also possible that the portable device interface does not comprise any specific mechanical parts. Rather, it may be employed in a wireless manner where the portable device can be connected to the portable device interface and, at the same time, move around freely, e.g., in the entire vehicle interior.

When employing the portable device to acquire and provide the 2d image data to the data interface via the portable device interface, it may be possible to reduce the number of parts and units dedicated to the gesture recognition. For example, it is possible that the vehicle processing unit is a vehicle head unit or vehicle infotainment device/head unit. Typically, vehicles may already comprise such a vehicle head unit and the recognizing of the gesture can then be implemented by a software code based on the 2d image data received from the portable device 2d sensor. In such a case, no additional hardware elements may be necessary. This may reduce the costs for the vehicle gesture recognition system.

The vehicle gesture recognition system may further comprise at least one 2d sensor configured for providing at least parts of the 2d image data to the data interface.

In other words, it may be possible to provide a dedicated 2d sensor. The 2d sensor may be configured to acquire the 2d image data and thereby act as an image source of the 2d image data.

The at least one 2d sensor may be selected from the group comprising: infrared sensor; 2d optical camera; capacitive sensor; magnetic field sensor; ultrasonic sensor; and touch pad.

Typically, such 2d sensors may have a comparably limited spatial resolution, e.g., less than 1000×1000 pixels, or less than 500×500 pixels, and may, therefore, be comparably inexpensive. It may therefore be possible to reduce the costs of the overall vehicle gesture recognition system.

For example, when a gesture-related object, e.g. a user's hand, moves in free space within the field of view of the magnetic field sensor (capacitive sensor), a distribution of the magnetic field (electric field) may get distorted which can be sensed by the sensor in a spatially resolved manner.

For example, when the gesture-related object moves above or in contact with the touch pad, this may be sensed by the sensor in a spatially resolved manner.

For example, it is possible that the vehicle gesture recognition system comprises a plurality of image sources, e.g., one or more 2d sensors and/or the portable device interface for receiving parts of the 2d image from the at least one 2d sensors and other parts of the 2d image data from the portable device 2d sensor. In such a case, said recognizing of the gesture may be executed for all or parts of the 2d image data received from the various image sources. For example, if the fields of view associated with the different image sources overlap, it may be possible to recognize said gesture in each of the respective 2d image data. One possible technique is to recognize said gesture individually from the respective parts of the 2d image data corresponding to the various image sources.

Moreover, because it may be possible that the fields of view of the different 2d image data differ, e.g. have different arrangement in space, the different 2d image data may correspond to various perspectives of the gesture. It may be possible to make use of the various points of views or perspectives of the gesture when recognizing the gesture from the received 2d image data. This may be achieved by recognizing said gesture in a correlated manner by taking into account the respective parts of the 2d image data corresponding to the various image sources in a combined and inter-coordinated gesture recognition. Examples may include stereoscopic reconstruction from the different perspectives of the gesture. Thereby, an increased likelihood of successfully recognizing the gesture may be achieved.

The vehicle processing unit may be a vehicle head unit, the vehicle head unit comprising a housing. At least one outer surface of the housing may be a cover shielding an interior of the vehicle head unit from a passenger compartment of the vehicle. The cover may comprise interface elements. The at least one 2d sensor may be located on the at last one outer surface.

The vehicle head unit may refer to a system of various electrical components which are integrated and arranged within the housing and provide various functionality such as vehicle control, air conditioning control, entertainment, communication and connectivity, safety and security, driver assistance, etc. The vehicle head unit may provide a graphical user interface (GUI) for such functionality. Typically, the vehicle head unit may be arranged close to the center console of the vehicle. The cover may form a part of the vehicle center console. The interface elements, e.g. buttons, rotary push buttons, a touch panel, etc., may allow user interfacing with the GUI. Said user interfacing based on the gesture may allow controlling the GUI to access information and/or execute commands.

In other words, the at least one 2d sensor may be provided physically integrated with the vehicle head unit. This may allow for simplified connection between the 2d sensor and the data interface. The 2d sensor may be provided in the vehicle center console.

The field of view of the at least one 2d sensor may be orientated substantially perpendicular to the at least one outer surface. In other words, the field of view may be orientated towards a central arm rest and/or cover a central area between the two front seats of the vehicle. In such a scenario, it may be possible to reliably detect gestures performed by a driver's right hand in front of the center console.

The portable device interface may be configured to releasably mount the portable device such that the field of view of the at least one 2d sensor and the field of view of the portable device 2d sensor are at least partially overlapping.

In other words, in a scenario where there is provided the at least one 2d sensor and the portable device interface coupled to the portable device 2d sensor, the respective fields of view may be arranged such that they cover a common region. If the gesture is executed in that common region, it may be recognized from the 2d image data obtained from, both, the portable device 2d sensor and the at least one 2d sensor. This may increase the likelihood of successful gesture recognition.

For example, it is possible that the fields of view of the portable device 2d sensor (as defined by the portable device interface) and the at least one 2d sensor enclose a certain angle with each other. For example, this certain angle may amount to 90°±45°, preferably 90°±20°.

In particular, it may be possible that the vehicle processing unit is configured for recognizing the gesture taking into account the predetermined position of the portable device and/or a predetermined position of the at least one 2d sensor.

For example, when the predetermined positions of the at least one 2d sensor and the portable device 2d sensor are known, e.g., with respect to each other or relative to each other, this may allow for a stereoscopic reconstruction of the gesture. By such means, a three-dimensional (3d) movement may be reconstructed from the 2d image data which may increase the likelihood of successful recognition of the gesture. Yet, it should be understood that in various simple scenarios the gesture may be individually detected for each of the at least one 2d sensor and the portable device 2d sensor, i.e., without determining any 3d coordinates.

The vehicle processing unit may be further configured for determining the predetermined position of the portable device based on the parts of the 2d image data received from the portable device 2d sensor and further based on parts of the 2d image data received from the at least one 2d sensor.

In other words, when the fields of view of the different parts of the 2d image data differ, it may be possible to deduce the camera position of the portable device camera, e.g. from a stereoscopic reconstruction of the recognized gesture. It may be possible to prompt the user to execute a well-defined calibration gesture for this purpose. Such a scenario may have the effect of flexible positioning of the portable device within the vehicle interior—while, at the same time, preserving a high recognition likelihood by using 2d image data from a plurality of 2d image data source. Such techniques may be particularly desirable when the portable device interface employs a wireless data connection to the portable device which allows a user to freely position the portable device according to his/her needs.

In the techniques discussed above, it may be possible to recognize the gesture based on the 2d image data. A certain limited, yet finite amount of computational resources may be required for said recognizing.

According to a further aspect, a vehicle gesture recognition system is provided comprising a data interface configured for receiving gesture data, the gesture data indicating a gesture. The vehicle gesture recognition system further comprises a portable device interface being configured for establishing a data connection between a portable device and the data interface. The data interface is further configured for receiving the gesture data via the data connection from a portable device application executed on the portable device. The vehicle processing unit is configured for controlling user interfacing with a user interface based on the gesture indicated by the gesture data.

The vehicle gesture recognition system according to the presently discussed aspect may have the effect that even less computational resources may be required. In particular, it may be possible to pre-recognize the gesture and merely receive the gesture data which, e.g. in parameterized form, indicates the gesture. In such scenarios, the vehicle gesture recognition system according to the presently discussed aspect may use the pre-recognized gesture for said user interfacing. As the vehicle gesture recognition system according to the present aspect may operate based on the gesture data, it may, more generally, also be referred to as a gesture controlled vehicle user interface.

The vehicle gesture recognition system may further comprise a portable device which is configured for being connected to the portable device interface. The portable device may comprise a touch sensitive display. The portable device may be configured to recognize a touch gesture by means of the touch sensitive display. The portable device may further be configured to determine gesture data, the gesture data indicating the touch gesture. Optionally, the portable device may further comprise an interface configured for sending the gesture data to a vehicle gesture recognition system according to further aspects of the disclosure.

For example, the gesture data may comprise indicators indicating at least one particular gesture from a predefined set of gestures. The indicators may indicate the gesture implicitly or explicitly. A look up table may be employed.

In other words, the gesture data may indicate one or more gestures, e.g., indirectly by means of a code—lookup table combination or the like. For example, the lookup table may correspond to the predefined set of gestures. The computational resources required at the vehicle processing unit may be limited to said user interfacing based on the pre-recognized gesture indicated by the gesture data.

In other scenarios, the gesture may be identified by the indicators by specifying a start point and/or an end point of a linear movement. In yet further scenarios, the gesture may be identified by the indicators by specifying a series of trace points of an arbitrary movement. Such points may relate to 2d or 3d coordinates of the movement in space. In further scenarios, the indicators can alternatively or additionally indicate a velocity of the movement associated with the gesture.

It is possible that the vehicle gesture recognition system according to the presently discussed aspect is configured according to a vehicle gesture recognition system according to further aspects of the present disclosure. In particular, it is possible that the data interface is, furthermore, configured for receiving the 2d image data and that the vehicle processing unit is, furthermore, configured for recognizing a further gesture from the received 2d image data.

There are various possibilities how the gesture data is determined by the portable device. In one scenario, the portable device may be configured to acquire 2d image data by means of a portable device camera. The portable device may be further configured to recognize the gesture from the acquired 2d image data and determine the gesture data in response to and based on said recognizing.

In a further scenario, the portable device may be configured to recognize a touch gesture by means of a touch sensitive display (touch panel) of the portable device. The touch gesture may relate to a contact or close-contact of an object, e.g. a user's hand, with the touch panel. The portable device may be further configured to determine the gesture data in response to and based on said recognizing. In such a scenario more complex gestures may be recognized, e.g. handwriting. It may be possible to control the user interface based on such gestures to enter a name, a song title, or a navigation destination.

According to a further aspect, a method of gesture recognition in a vehicle is provided. The method comprises receiving 2d image data of at least one field of view within the vehicle. The method further comprises, in a vehicle processing unit, recognizing a gesture from the received 2d image data. The method further comprises, in the vehicle processing unit, controlling user interfacing with a user interface based on the recognized gesture.

For such a method of gesture recognition, effects may be obtained which are comparable to the effects which may be obtained with a vehicle gesture recognition system according to a further aspect of the present disclosure.

According to a further aspect, a method of gesture recognition in a vehicle is provided. The method comprises establishing a data connection between a portable device and a portable device interface and receiving gesture data indicating a gesture via the data connection from a portable device application executed on the portable device. The method comprises, in a vehicle processing unit, controlling user interfacing with a user interface based on the gesture indicated by the gesture data.

For such a method of gesture recognition, effects may be obtained which are comparable to the effects which may be obtained with a vehicle gesture recognition system according to a further aspect of the present disclosure.

According to a further aspect, a vehicle gesture recognition system is provided. The vehicle gesture recognition system comprises a data interface configured for receiving 2d image data of at least one field of view within the vehicle. The data interface is further configured for receiving gesture data indicating a gesture. The vehicle gesture recognition system further comprises a vehicle processing unit configured for selective recognizing a further gesture from the 2d image data, in response to said receiving of the 2d image data. The vehicle gesture recognition system is further configured for controlling user interfacing with a user interface based on the gesture indicated by the gesture data and/or based on the recognized further gesture.

According to a further aspect, a portable device gesture recognition system is provided. The portable device gesture recognition system comprises a 2d camera with a field of view. The portable device is configured to acquire 2d image data by means of the 2d camera and to recognize a gesture from the acquired 2d image data. The portable device is further configured to determine gesture data, the gesture data indicating the gesture. Optionally, the portable device may further comprise an interface configured for sending the gesture data to a vehicle gesture recognition system according to further aspects of the disclosure.

According to a further aspect, a portable device gesture recognition system comprising a portable device is provided. The portable device comprises a touch sensitive display. The portable device is configured to recognize a touch gesture by means of the touch sensitive display. The portable device is further configured to determine gesture data, the gesture data indicating the touch gesture. Optionally, the portable device may further comprise an interface configured for sending the gesture data to a vehicle gesture recognition system according to further aspects of the disclosure.

According to a further aspect, a vehicle gesture recognition system is provided which comprises a data interface. The data interface is configured to receive two-dimensional, 2d, image data of at least one field of view within the vehicle. The vehicle gesture recognition system further comprises a first 2d sensor configured for providing at least parts of the 2d image data to the data interface. The vehicle gesture recognition system further comprises a second 2d sensor configured for providing at least parts of the 2d image data to the data interface. A field of view of the first 2d sensor is at least partially overlapping with a field of view of the second 2d sensor. The fields of view of the first and second 2d sensors are approximately perpendicular with respect to each other. The vehicle gesture recognition system further comprises a vehicle processing unit configured for recognizing a gesture from the received 2d image data, and further configured for controlling user interfacing with a user interface based on the recognized gesture.

Because the fields of view of the first and second 2d sensors enclose approximately an angle of 90°, i.e., an angle of 90°±20°, more advantageously 90°±5°, even more advantageously 90°±1°, they can depict the gesture from different and complementary view points. Thereby, a three-dimensional gesture may be recognized. Further, the recognizing may be more reliable.

For example, the first 2d sensor may be selected from the group comprising: infrared sensor; 2d optical camera; capacitive sensor; magnetic field sensor; ultrasonic sensor; and touch pad. For example, the second 2d sensor may be selected from the group comprising: infrared sensor; 2d optical camera; capacitive sensor; magnetic field sensor; ultrasonic sensor; and touch pad.

The first sensor and/or the second sensor may be fixedly integrated with the vehicle.

It is to be understood that the features mentioned above and features yet to be explained below can be used not only in the respective combinations indicated, but also in other combinations or in isolation, without departing from the scope of the present disclosure. Features of the above-mentioned aspects and embodiments may be combined with each other in other embodiments. In particular, the features of the various vehicle gesture recognition systems of different aspects may be combined. It may also be possible that the aspects of the portable device gesture recognition systems are combined with the vehicle gesture recognition system, e.g., in one system.

BRIEF DESCRIPTION OF THE DRAWINGS

In the following, the disclosure will be explained in further detail with respect to embodiments illustrated in the accompanying drawings.

DETAILED DESCRIPTION

Figure 1:
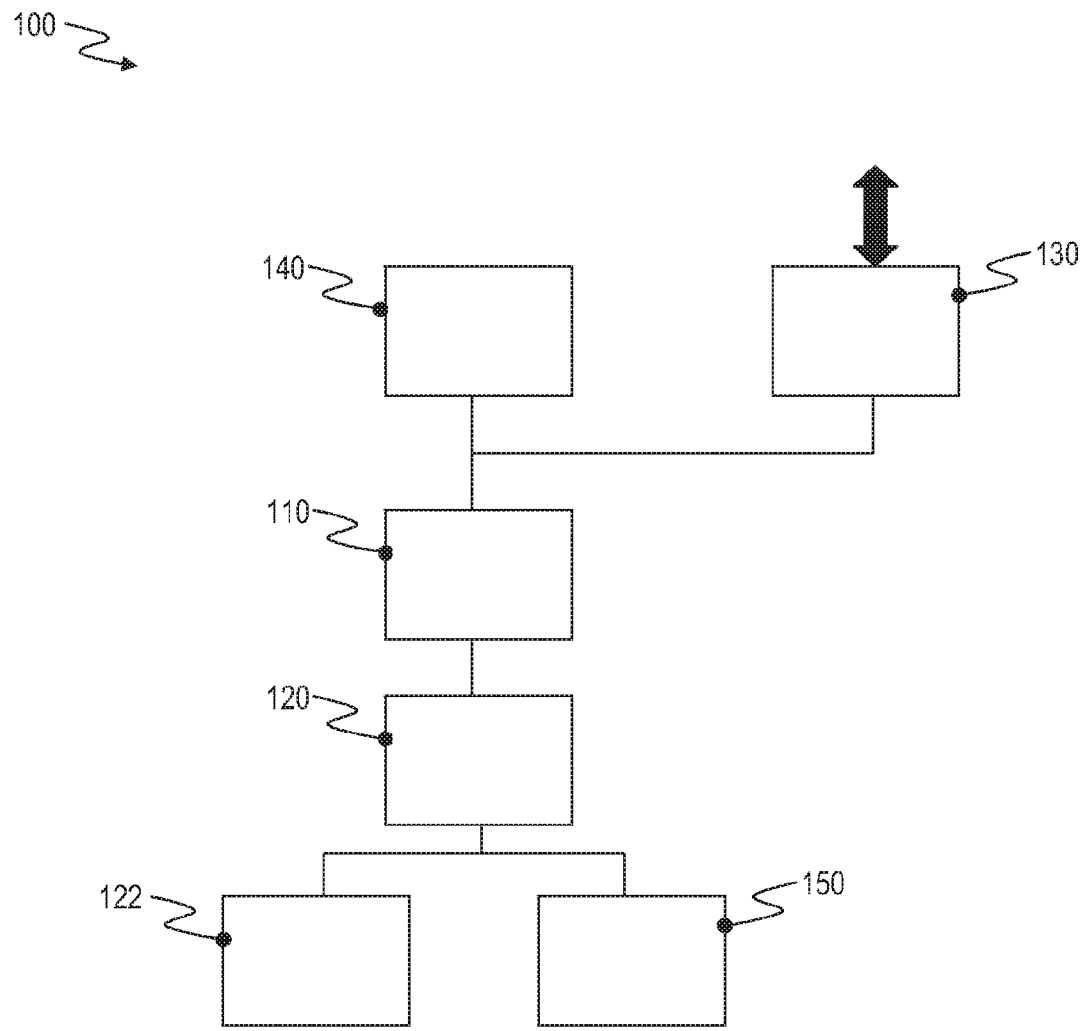
FIG. 1 is a schematic illustration of a vehicle gesture recognition system according to various embodiments.

The foregoing and additional features and effects of the disclosure will become apparent from the following detailed description when read in conjunction with the accompanying drawings, in which like reference numerals refer to like elements. The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software or a combination thereof.

In FIG. 1, a vehicle gesture recognition system 100 is schematically illustrated. The vehicle gesture recognition system 100 comprises a vehicle processing unit 120 coupled to interface elements 122 and a display 150. For example, the interface elements 122, sometimes referred to as control elements, can comprise a touch panel, buttons, rotary push buttons, etc. The vehicle processing unit 120 is configured to provide a GUI on the display 150 for user interfacing.

Furthermore, the vehicle processing unit is coupled to a data interface 110. The data interface 110 can be configured to receive 2d image data from an at least one image source covering a field of view within the vehicle; additionally or alternatively the data interface 110 can be configured to receive gesture data indicating a gesture. For example, when the data interface 110 is configured for receiving 2d image data, the vehicle processing unit 120 can recognize a gesture from the received 2d image data.

Figure 2:
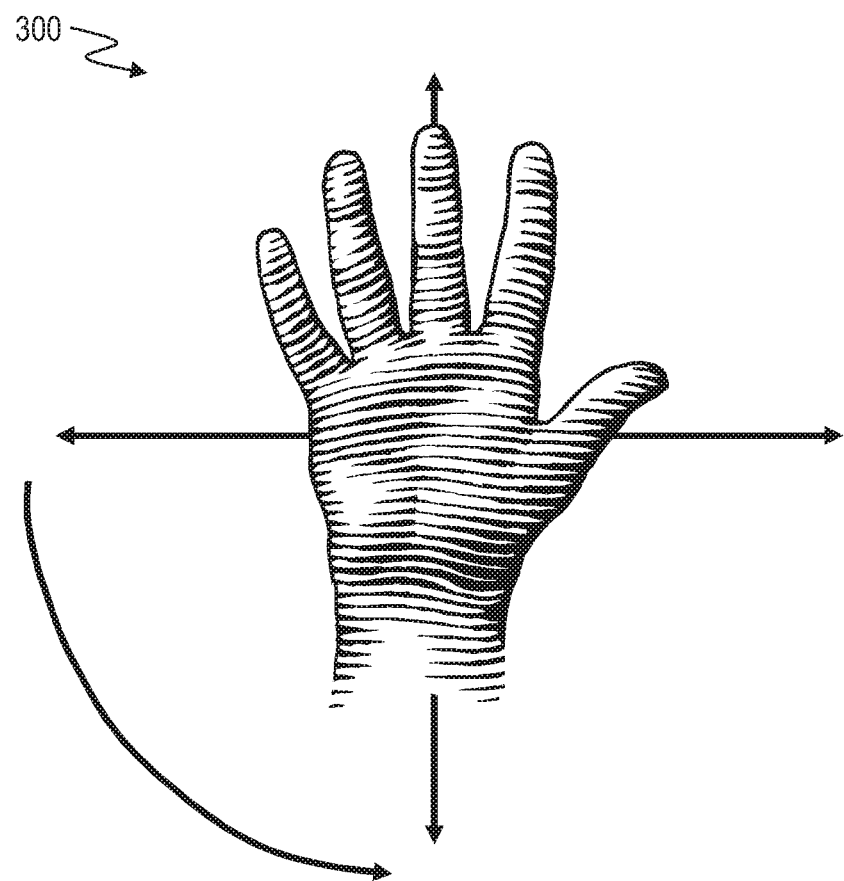
FIG. 2 illustrates a gesture.

Turning to FIG. 2 where a gesture 300 is illustrated. For example, the depicted hand of a user may be wiped horizontally or vertically or may be turned. These movements may correspond to different gestures.

Figure 3:
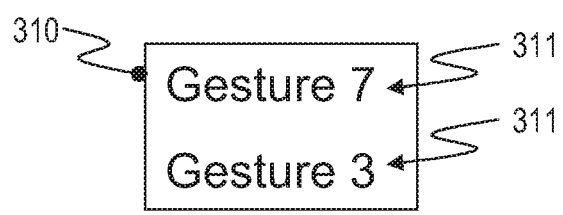
FIG. 3 illustrates gesture data including indicators indicating at least one specific gesture from a predefined set of gestures.

In FIG. 3, gesture data 310 is schematically illustrated. The gesture data 310 comprises two indicators 311, each indicating a particular gesture 300 in a parameterized manner. For example, the gesture labeled "7" may correspond to a wiping gesture from left to right, while the gesture labeled "3" may correspond to a turning of the hand. Such gestures 300 as discussed with respect to FIG. 3 above are merely illustrative and are not to be construed as being limiting.

Turning back to FIG. 1, by recognizing the gesture 300 from the 2d image data and/or by obtaining the pre-recognized gesture 300 from the indicators 311 of the gesture data 310, a certain gesture 300 is provided to the vehicle processing unit 120. Based on this gesture 300, the vehicle processing unit 120 is configured for controlling user interfacing with the GUI displayed on the display 150. As a specific example, it is possible that a wiping gesture from left to right moves a cursor of the GUI. Respectively, it is possible that a pushing gesture executes a certain command or menu entry of the GUI where the cursor is currently positioned.

As will be appreciated from the above, the gesture control of the GUI can be based on either 2d image data of the gesture 300, or the gesture 300 indicated by the gesture data 310, or a combination thereof. Scenarios where the 2d image data is employed will be discussed next.

For example, the data interface 110 may receive at least parts of the 2d image data from a 2d sensor 140. For example, the 2d sensor 140 can be an infrared sensor, a 2d optical camera, a capacitive sensor, a magnetic field sensor, or an ultrasonic sensor. It is possible to provide a plurality of 2d sensors 140 which can each contribute to providing the 2d image data. In such a scenario, each of the plurality of 2d sensors 140 may provide a part of the 2d image data.

In particular, compared to scenarios where 3d sensors and 3d image data is provided, said recognizing of the gesture from the received 2d image data may be comparably simple. This may reduce the required computational efforts for said recognizing in the vehicle processing unit 120. At the same time, it is possible to provide a reliable recognizing of the gesture 300, e.g. by providing a plurality of 2d sensors 140. Redundant and multiple recognizing of the gesture 300 may then be possible, e.g. if the respective fields of view of the plurality of 2d sensors 140 overlap and the gesture is executed in the common region.

In further scenarios, a cell phone interface 130 is configured for establishing a data connection between a cell phone (not shown in FIG. 2) and the data interface 110. In general, a connection may be established between the portable device interface 130 to any portable device, e.g., a touch pad, laptop, gaming console, webcam, cell phone etc. The data interface 110 is configured to receive at least parts of the 2d image data via the data connection of the cell phone interface 130 from a 2d camera of the cell phone. In other words, it is possible to employ the 2d camera of the cell phone as image source in order to acquire and receive the 2d image data.

It is possible to receive the 2d image data via the cell phone interface 130 alternatively or additionally to 2d image data received from at least one 2d sensor 140. In other words, in various examples it may be dispensable to provide the 2d sensor 140; in other scenarios, it may be dispensable to provide the cell phone interface 130.

Additionally or alternatively to the receiving of at least parts of the 2d image data via the cell phone interface 130, the cell phone interface 130 can be configured to receive the gesture data 310. This will be explained in more detail below.

In one scenario, the gesture data 310 relates to a gesture 300 executed within the field of view of a cell phone camera. An application executed on the cell phone can recognize this free-space gesture 300, e.g. a wipe left-to-right or turning of the hand, and determine the respective gesture data 310 for the recognized gesture 300.

In a further scenario, the gesture data 310 relates to a gesture 300 executed on a touch panel of the cell phone. Cell phones may comprise a touch-sensitive display as the touch panel. Typically, capacitive sensors are employed for this purpose. An application executed on the cell phone can recognize this touch gesture 300 and determine the respective gesture data 310 for the recognized gesture 300. It is possible to obtain the gesture data from both, a cell phone touch panel and a cell phone camera.

In other words, the cell phone interface 130 can be configured to receive 2d image data and/or gesture data 310. Depending on the particular application, i.e. if it is desired to recognize free-space gestures 300 executed in a field of view of the cell phone camera and/or recognizing touch gestures 300 executed on a touch panel of the cell phone, either one of the scenarios or both scenarios may be implemented.

The units illustrated in FIG. 1 can be implemented using hardware and/or software where applicable. For example, it is possible to implement the data interface 110 and/or cell phone interface 130 primarily has software executed on the vehicle processing unit. This may be in particularly true if wireless technology is applied for the data connection with the cell phone. Antennas for the wireless connection may be provided.

Figure 4:
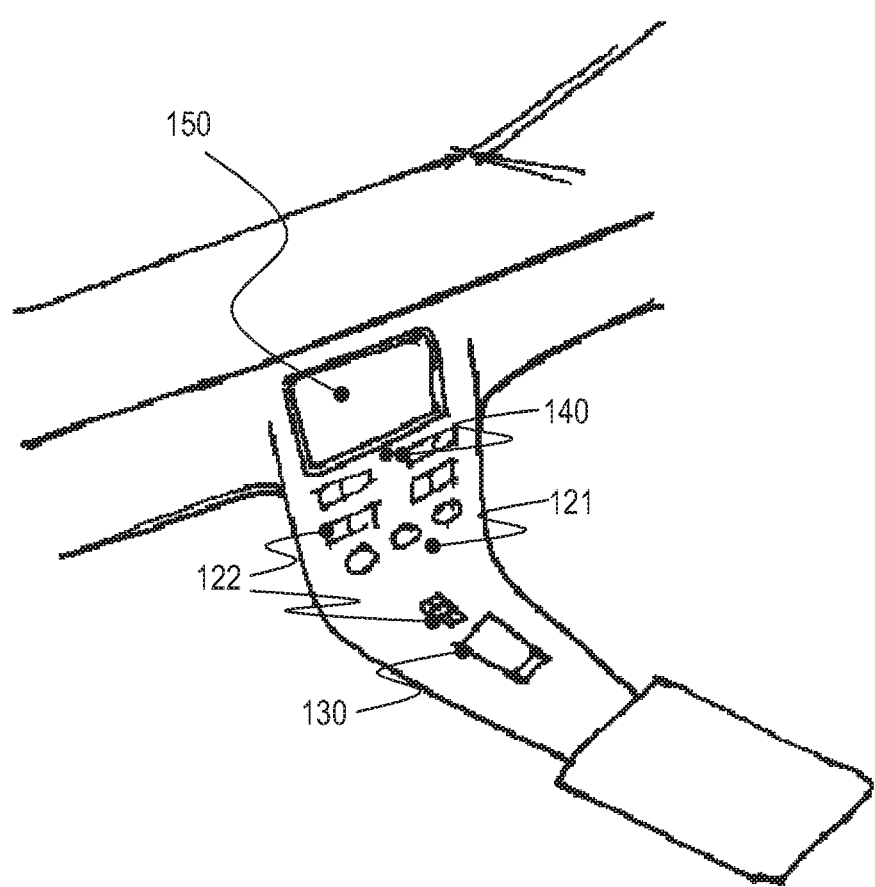
FIG. 4 is a perspective view of a vehicle center console including the vehicle gesture recognition system of FIG. 1.

Turning to FIG. 4, a perspective view of a center console and middle console of a vehicle is depicted. Visible in FIG. 4 is the display 150, the 2d sensor 140, the interface elements 122, and the cell phone interface 130. In the scenario depicted in FIG. 4, the vehicle processing unit 120 is associated with a vehicle head unit comprising a housing where one outer surface is a cover 121 shielding an interior of the vehicle head unit from the passenger compartment of the vehicle. The interface elements 122, as well as the display 150, and the 2d sensor 140 are located on the cover 121. In other words, the 2d sensor 140 is fully integrated with the vehicle head unit which makes the coupling and data communication between the 2d sensor 140 and the data interface 110 comparably simple.

As can be further seen from FIG. 4, the cell phone interface 130 is configured to releasably mount the cell phone in a predetermined position, namely in the scenario of FIG. 4, in the middle console between driver and co-driver. The cell phone interface 130 is arranged such that the mounted cell phone faces approximately along the vertical direction. The cell phone interface 130 further comprises locking means, which engage with side surfaces of the cell phone in order to secure the cell phone in the predetermined position. In the scenario of FIG. 4 it is possible to obtain 2d image data from both, the 2d camera of the cell phone mounted to the cell phone interface 130 as well as from the 2d sensor 140 located at the outside surface 121 of the vehicle head unit 120.

Figure 5:
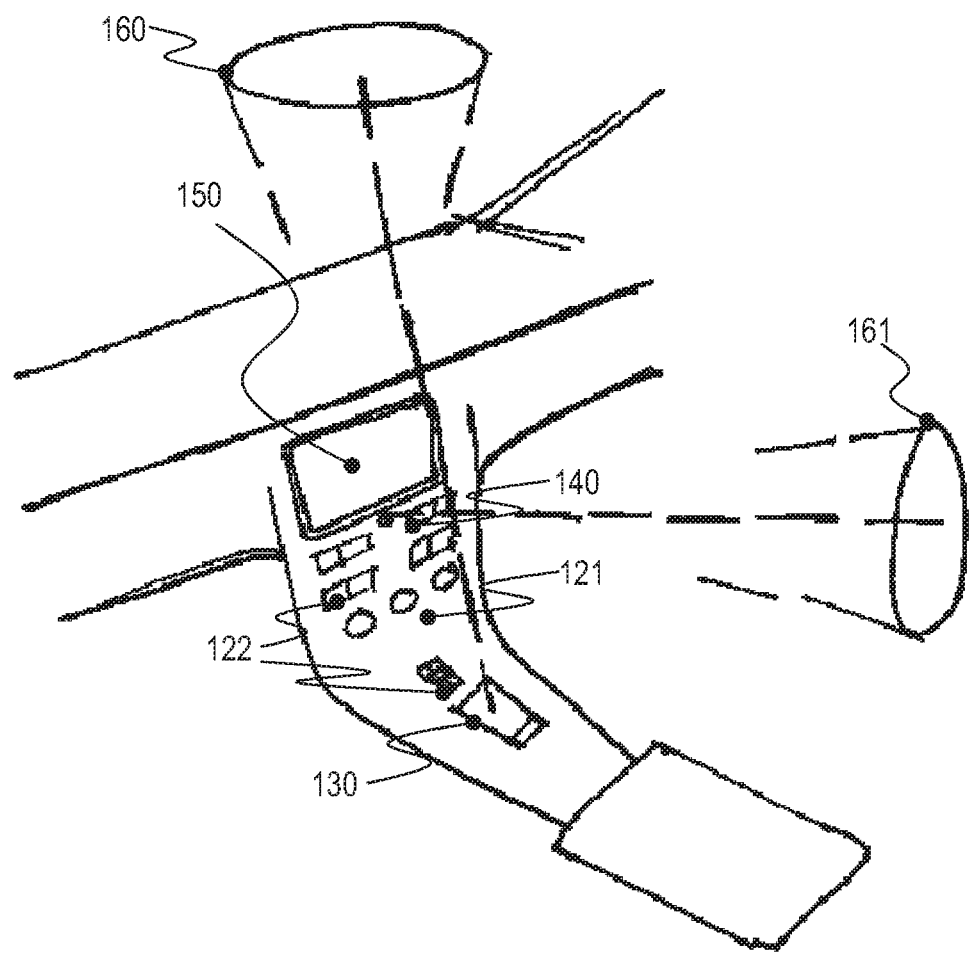
FIG. 5 illustrates fields of view of a 2d sensor and a cell phone camera for the system of FIG. 4.

Turning to FIG. 5, the fields of view 160, 161 of the cell phone camera and the 2d sensor 140, respectively, are graphically indicated. As can be seen from FIG. 5, the cell phone interface 130 is configured for releasably mounting the cell phone such that the fields of view 160, 161 of the at least one 2d sensor and the cell phone camera overlap. The field of view 160 of the cell phone camera, i.e. as defined by the cell phone interface 130, is approximately orientated vertically. The field of view 161 of the 2d sensor 140 is approximately orientated horizontally. In particular, a common region of the fields of view 160, 161 is located in the free space between the middle and center consoles. If the user executes the gesture 300 in this common region, the 2d image data received from both, the cell phone interface 130 and the 2d sensor 140, depict the gesture 300.

The fields of enclose approximately an angle of 90°, i.e. offer substantially different perspectives onto the common region. This may facilitate said recognizing of the gesture. Complementary 2d image data may be available allowing to unambiguously recognize a wide variety of gestures 300.

The vehicle processing unit 120 can then recognize the gesture 300 individually from both 2d image data sets or can use knowledge about the relative positioning of the 2d sensor 140 with respect to the cell phone camera in order to recognize the gesture 300 in a correlated manner. In other words, the vehicle processing unit 120 can be configured to recognize the gesture 300 taking into account the predetermined position of the cell phone and/or the predetermined position of the 2d sensor 140. For example, this can occur as part of a stereoscopic reconstruction which allows to determine 3d position information of the gesture 300 executed within the field of views 160, 161. Respective techniques are known to the skilled person such that further details need not be discussed in this context.

In the scenario of FIGS. 4 and 5, the cell phone interface 130 is shown in a fixed location on the middle console of the vehicle. Yet, it should be understood that in various scenarios it is possible that the cell phone interface 130 is freely movable throughout the interior of the vehicle. For example, this can be the case when the data connection between the cell phone interface 130 and the cell phone is established in a wireless manner and/or if the cell phone interface 130 is implemented via software. In such a scenario it may be possible that the vehicle processing unit 120 is further configured for determining the predetermined position of the cell phone—and therefore of the cell phone interface 130—based on parts of the 2d image data received from the 2d camera of the cell phone and further based on parts of the 2d image data received from the at least one 2d sensor. For example, this may occur as part of a correlated gesture recognition where based on a stereoscopic reconstruction, e.g. of a reference gesture 300, the camera position of the cell phone camera is determined.

Figure 6:
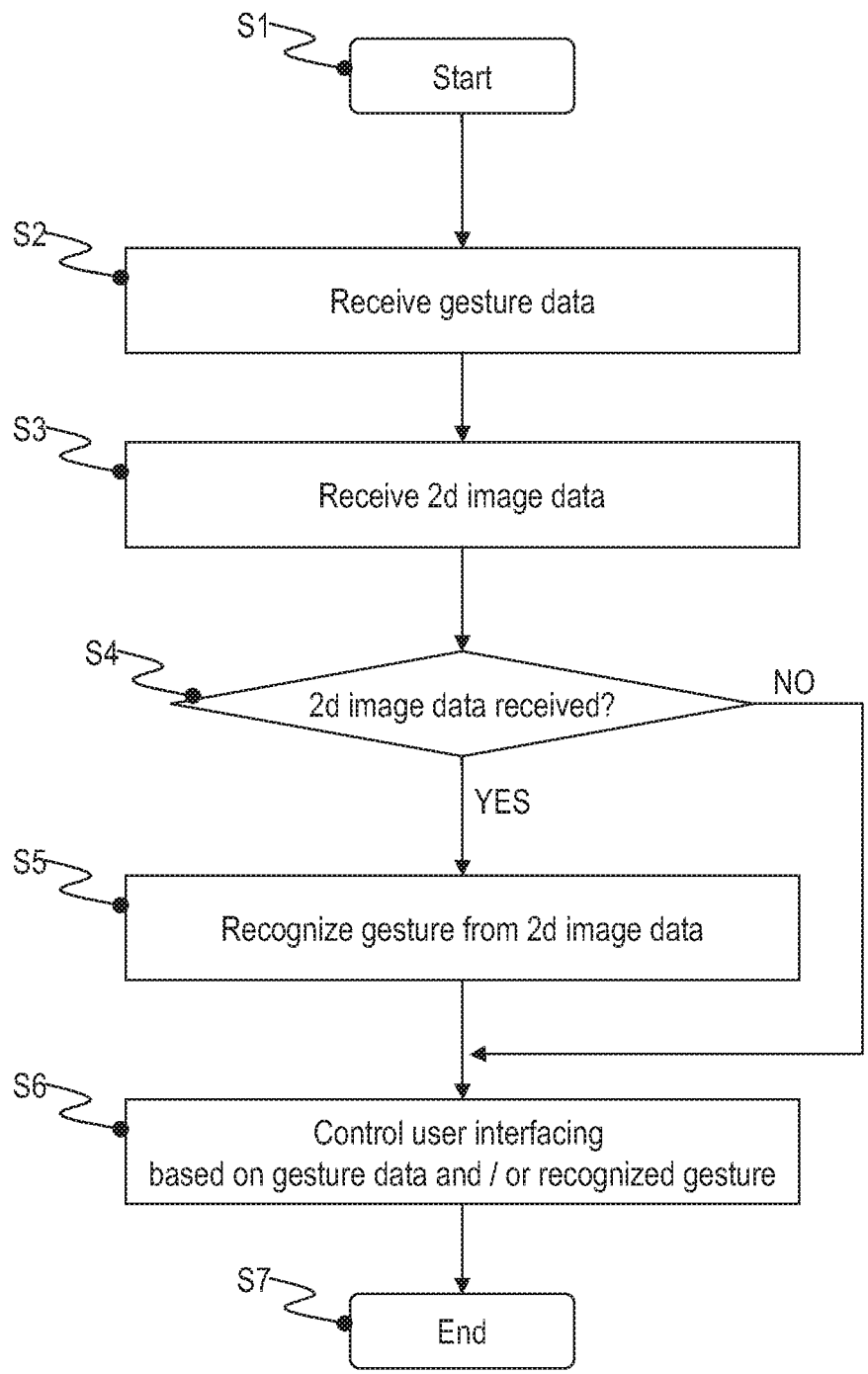
FIG. 6 is a flowchart of a method of gesture recognition in a vehicle according to various embodiments.

In FIG. 6 a flowchart of a method of gesture recognition is shown. The method starts with step S1.

In step S2, the gesture data 310 is received. Step S2 is an optional step. As discussed previously with respect to FIG. 1, in various scenarios no gesture data 310 is received—alternatively or additionally to step S2, it is possible to receive 2d image data (step S3).

For example, the 2d image data in step S3 can be received from the 2d senor 140 and/or the cell phone camera via the cell phone interface 130.

In step S4, it is checked whether 2d image data has been received in step S3. If so, in step S5, the gesture 300 is recognized from the 2d image data. Otherwise, the method commences with step S6.

In step S6, the vehicle head unit 120 controls the GUI displayed on the display 150 based on the gesture 300 which was recognized based on the 2d image data in step S5 and/or indicated by the received gesture data 310 in step S2.

The method ends in step S7. It should be understood that the particular order of the steps may vary. E.g. it is possible to receive gesture data in step S4 only after step S5 has been executed.

As can be seen from the above, the vehicle head unit may rely on various input channels for receiving either pre-recognized gesture data and/or 2d image data which can be used for gesture recognition. The 2d image data may originate from various image sources, e.g. cameras, touch pads, etc.

Although the disclosure has been shown and described with respect to certain preferred embodiments, equivalents and modifications will occur to others skilled in the art upon the reading and understanding of the specification. The present disclosure includes all such equivalents and modifications. For example, while the disclosure has been described predominantly with respect to vehicles such as passenger cars, it should be understood that vehicles such as airplanes, trains, trucks, etc. may also employ techniques described herein.

The invention claimed is:

1. A vehicle gesture recognition system, comprising:
   a data interface configured for receiving gesture data, the gesture data including an indicator indicating a gesture from a predefined set of gestures selected for use with a vehicle processing unit, the gesture data including gestures detected based on image data from a 2d sensor of a portable device, the detected gestures restricted to the predefined set of gestures, wherein the indicator indicates the detected gestures indirectly, and wherein fields of view of the 2d sensor of the portable device and at least one other 2d sensor overlap in a common region located in free space of a passenger compartment between a middle console and a center console;
   a portable device interface being configured for:
      establishing a data connection between the portable device and the data interface, wherein the data interface is further configured for receiving the gesture data via the data connection from a portable device application executed on the portable device; and
   the vehicle processing unit configured for controlling user interfacing with a user interface based on the gesture indicated by the gesture data.

2. The vehicle gesture recognition system of claim 1, wherein the indicator indicates the gesture indirectly by use of a code and a lookup table, the lookup table corresponding to the predefined set of gestures.

3. The vehicle gesture recognition system of claim 1, wherein the indicator indicates the gesture by specifying a start point of a linear movement associated with the gesture.

4. The vehicle gesture recognition system of claim 1, wherein the indicator indicates the gesture by specifying an end point of a linear movement associated with the gesture.

5. The vehicle gesture recognition system of claim 1, wherein the indicator indicates the gesture by specifying a series of trace points of a movement associated with the gesture.

6. The vehicle gesture recognition system of claim 5, wherein the series of trace points relates to 2D or 3D coordinates of the movement in space.

7. The vehicle gesture recognition system of claim 1, wherein the indicator indicates a velocity of a movement associated with the gesture.

8. The vehicle gesture recognition system of claim 1, wherein the at least one other 2d sensor is physically integrated with a vehicle head unit in a vehicle.

9. The vehicle gesture recognition system of claim 1, wherein the gesture data further includes a three-dimensional movement reconstructed from the image data from the 2d sensor of the portable device and data received from the at least one other 2d sensor.

10. A method of gesture recognition in a vehicle, comprising:
    establishing a data connection between a portable device and a portable device interface;
    receiving gesture data including an indicator indicating a gesture from a predefined set of gestures selected for use with a vehicle processing unit via the data connection from a portable device application executed on the portable device, the gesture data including gestures detected based on image data from a 2d sensor of the portable device, the detected gestures restricted to the predefined set of gestures, wherein the indicator indicates the detected gestures indirectly, and wherein a field of view of the 2d sensor of the portable device and a field of view of one other 2d sensor overlap in a common region located in free space of a passenger compartment between a middle console and a center console; and
    in the vehicle processing unit, controlling a user interface based on the gesture indicated by the gesture data.

11. The method of claim 10, wherein the indicator indicates the gesture indirectly by use of a code and a lookup table, the lookup table corresponding to the predefined set of gestures.

12. The method of claim 10, further comprising identifying the gesture by the indicator, the indicator specifying a start point of a linear movement associated with the gesture.

13. The method of claim 10, further comprising identifying the gesture by the indicator, the indicator specifying an end point of a linear movement associated with the gesture.

14. The method of claim 10, further comprising identifying the gesture by the indicator, the indicator specifying a series of trace points of a movement associated with the gesture.

15. The method of claim 14, wherein the series of trace points relates to 2D or 3D coordinates of the movement in space.

16. The method of claim 10, wherein the indicator indicates a velocity of a movement associated with the gesture.

17. The method of claim 10, further comprising determining a predetermined position of the portable device based on the image data received from the 2d sensor of the portable device and further based on data received from the one other 2d sensor.

18. A vehicle head unit of a vehicle, the vehicle head unit comprising:
    a data interface configured for receiving gesture data, the gesture data including an indicator indicating a gesture from a predefined set of gestures selected for use with a vehicle processing unit, the gesture data including gestures detected based on image data from a 2d sensor of a portable device, the detected gestures restricted to the predefined set of gestures, wherein the indicator indicates the detected gestures indirectly, and wherein fields of view of the 2d sensor of the portable device and at least one other 2d sensor overlap in a common region located in free space of a passenger compartment between a middle console of the vehicle and a center console of the vehicle;

a portable device interface being configured for:
  establishing a data connection between the portable device and the data interface, wherein the data interface is further configured for receiving the gesture data via the data connection from a portable device application executed on the portable device; and
the vehicle processing unit configured for controlling user interfacing with a user interface of the vehicle based on the gesture indicated by the gesture data.

19. The vehicle head unit of claim 18, wherein the indicator indicates the gesture by specifying one or more of a start point, an end point, a series of trace points, and a velocity of a movement associated with the gesture.

20. The vehicle head unit of claim 18, wherein the gestures are detected based on the image data from the 2d sensor of the portable device and the at least one other 2d sensor by redundant and multiple recognizing of the detected gestures from the image data from both the 2d sensor of the portable device and the at least one other 2d sensor in a correlated manner.

* * * * *